United States Patent
Schmitt

(10) Patent No.: US 8,280,361 B2
(45) Date of Patent: Oct. 2, 2012

(54) METHOD FOR RENEWING PROGRAM FILES OF A PROGRAMMABLE MOBILE TELECOMMUNICATIONS TERMINAL

(75) Inventor: Harald Schmitt, Bendorf (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 10/495,181

(22) PCT Filed: Nov. 14, 2002

(86) PCT No.: PCT/DE02/04218
§ 371 (c)(1),
(2), (4) Date: Oct. 15, 2004

(87) PCT Pub. No.: WO03/047287
PCT Pub. Date: Jun. 5, 2003

(65) Prior Publication Data
US 2005/0048959 A1    Mar. 3, 2005

(30) Foreign Application Priority Data
Nov. 15, 2001 (DE) .................................. 101 55 998

(51) Int. Cl.
*H04M 3/00* (2006.01)
(52) U.S. Cl. ....................... 455/418; 455/419; 455/435.1
(58) Field of Classification Search .................. 455/418, 455/420, 419, 435.1
See application file for complete search history.

(56) References Cited

U.S. PATENT DOCUMENTS

| 5,588,042 | A | * | 12/1996 | Comer | 455/413 |
| 5,854,978 | A | | 12/1998 | Heidari | |
| 5,887,254 | A | * | 3/1999 | Halonen | 455/419 |
| 6,021,333 | A | * | 2/2000 | Anderson et al. | 455/560 |
| 6,122,503 | A | * | 9/2000 | Daly | 455/419 |
| 6,879,825 | B1 | * | 4/2005 | Daly | 455/419 |
| 6,993,328 | B1 | * | 1/2006 | Oommen | 455/419 |
| 2001/0011019 | A1 | * | 8/2001 | Jokimies | 455/449 |
| 2002/0077094 | A1 | * | 6/2002 | Leppanen | 455/420 |

FOREIGN PATENT DOCUMENTS

| DE | 19543843 | | 5/1997 |
| DE | 19717149 | | 10/1998 |
| DE | 19751318 | | 5/1999 |
| DE | 19750366 | | 6/1999 |
| DE | 19746132 | | 9/1999 |
| EP | 0685972 | | 6/1995 |
| GB | 2357011 | | 6/2001 |
| GB | 2357011 | A * | 6/2001 |
| WO | WO 9716938 | | 9/1997 |

* cited by examiner

*Primary Examiner* — Charles Appiah
*Assistant Examiner* — Jaime Holliday
(74) *Attorney, Agent, or Firm* — Cooper & Dunham LLP

(57) ABSTRACT

The invention relates to a method for renewing program files of a programmable, mobile telecommunications terminal, according to which the program files are transmitted from a telecommunications network to the telecommunications terminal via the air interface. The aim of the invention is to allow the program files to be renewed in a simple and cost-effective manner and with little effort. To achieve this, the terminal type is determined by the telecommunications network, new program files that exist in devices of the telecommunications network, or are available elsewhere are determined and made available for the identified terminal type and the existing new program files are automatically transmitted to the terminal via the air interface.

3 Claims, 1 Drawing Sheet

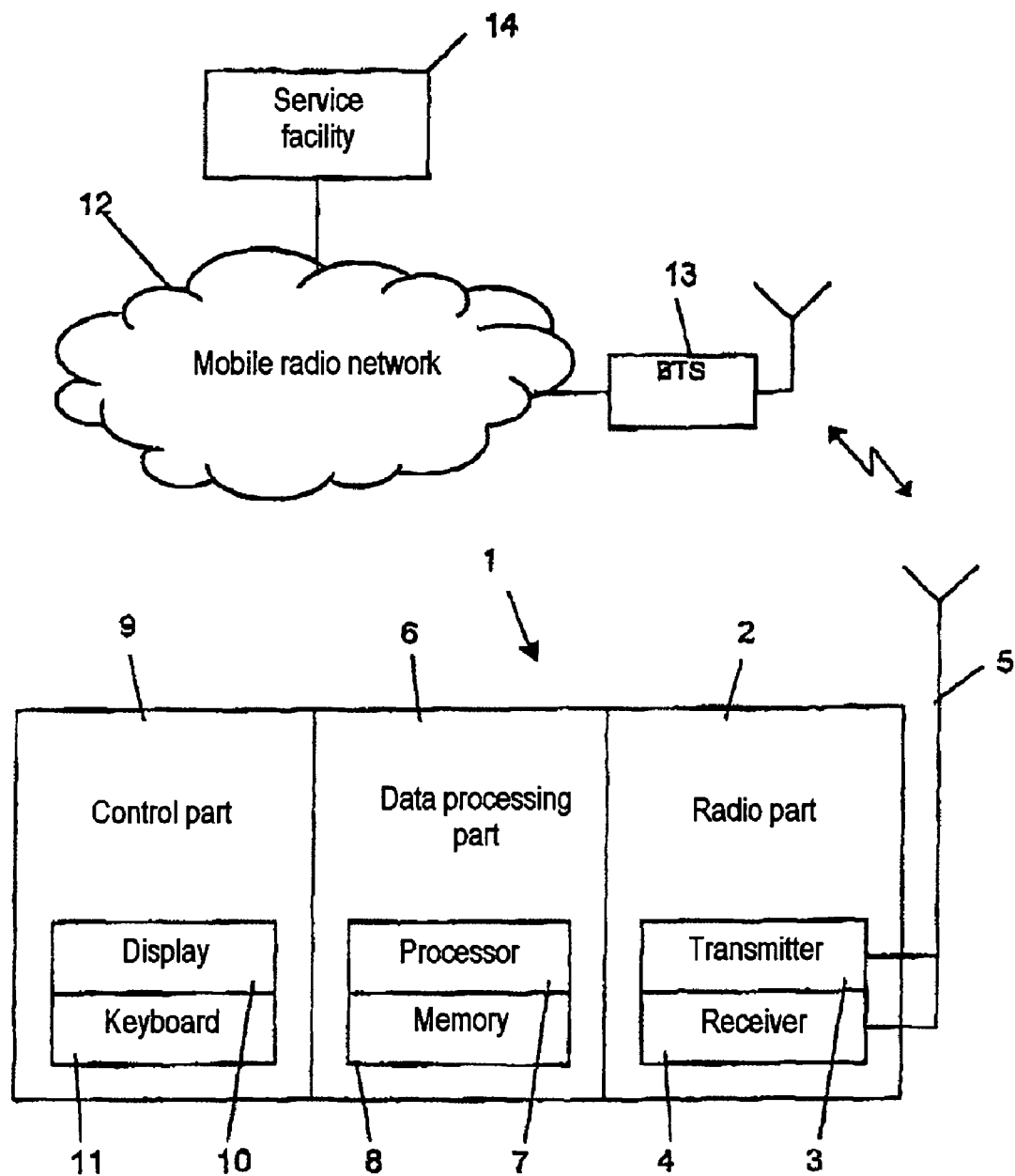

METHOD FOR RENEWING PROGRAM FILES OF A PROGRAMMABLE MOBILE TELECOMMUNICATIONS TERMINAL

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR REFERENCE TO A MICROFICHE APPENDIX

Not Applicable

BACKGROUND OF THE INVENTION

1. Field of the Invention

The present invention relates to a method for renewing program files, for example in the form of software upgrades, of a programmable mobile telecommunications terminal, in particular a mobile radio terminal.

2. Description of the Related Art

Modern technical appliances, such as mobile telecommunications terminals as well, contain electronic and mechanical hardware and corresponding software in the form of program files for controlling the operation of the hardware. Mobile radio terminals essentially comprise a data processing device with processor and memory means, a transmitting and receiving device, a display device as well as an input device. These devices are controlled via software that is stored in the memory means.

As the technology is increasingly developed further, software upgrades are repeatedly required for telecommunications terminals, in particular mobile radio terminals, as well. Such requirements can occur as a result of defects in the appliance, which occur only during operation. Furthermore, software upgrades can arise for mobile radio terminals by the network operator introducing new functionalities or services within a mobile radio network. A network operator does not want to adversely affect the operability of already delivered mobile radio terminals by the introduction of new services. However, if new network services have a negative influence on the operation of the terminal, or if use of the new service is impossible, then a software upgrade is required for this terminal. In this case, the network operator is responsible for the software upgrade for the terminals.

So-called programmable mobile radios are prior art. Terminals such as these are generally supplied with new software via an interface. This type of software upgrade can normally not be carried out by the subscriber or the terminal user himself. To do this, the terminals must be sent to appropriate facilities with the network operator or the appliance manufacturer. This means costly recall of the corresponding appliances for the situation when new network services necessitate a software upgrade.

Recently, it has been possible to renew the software standard of a terminal via the Internet. In this case, the terminal user loads the new terminal software via the Internet, for example into his personal computer. The terminal software is then loaded into the terminal via an interface between the PC and the terminal, generally an RS232 or infrared interface. However, only those with appropriate technical skills and Internet access have this capability. A further major disadvantage of both methods is that the subscriber or the terminal user must himself be appropriately active.

BRIEF SUMMARY OF THE INVENTION

This invention relates to a method for renewing program files of a programmable, mobile telecommunications terminal. The program files are transmitted by a telecommunications network, via an air interface to the telecommunications terminal. An IMEI of the terminal is transmitted from the terminal to the telecommunications network, thereby initiating the renewing of the program files. The terminal type is determined by the telecommunications network on the basis of the IMEI for the terminal. New program files which are present in devices in the telecommunications network or are available elsewhere are determined and provided for the terminal type determined. The existing new program files are automatically transferred via the air interface to the terminal.

BRIEF DESCRIPTION OF THE SEVERAL VIEWS OF THE DRAWINGS

FIG. 1 shows a mobile radio terminal according to an embodiment of the present invention.

DETAILED DESCRIPTION OF THE INVENTION

The object of the invention is to specify a method for renewing program files of a programmable mobile telecommunications terminal, which is simple, cost-effective and involves little effort.

The advantage of the invention is that the process of renewing program files for mobile radios within a mobile radio network can be automated and can be carried out independently of the location. It is thus possible to upgrade the software for a terminal without the terminal user having to be active or being aware of this. Furthermore, this drastically reduces the efforts and the costs for a software upgrade, for example those that would be incurred with a recall action, both for the terminal user and for the network operator or manufacturer.

The basic idea of this invention is to distribute the program files to be renewed for a mobile terminal by means of the existing data services within a mobile radio network. The terminal receives the new program files, and automatically uses them to replace the old program files. This method does not require any additional equipment.

Since the mobile radio networks will in future offer-services using ever higher data rates, for example GPRS (General Packet Radio Service) or UMTS (Universal Mobile Telecommunication Service), it is possible to transmit even relatively extensive program files via radio networks. The program parts of the terminal software will be transmitted via these high-speed data services of a radio network to the respective terminals which need to be upgraded.

Furthermore, the implementation of this invention requires a terminal which can receive and store new software parts during operation. Once all the new software parts have been'received completely, the terminal automatically carries out a software change.

The invention advantageously allows automatic identification of the need to replace terminal software. Each terminal has a unique appliance number, the so-called IMEI (International Manufacturer Equipment Identity). The terminal type can be determined from this IMEI number. Whenever a connection is set up between the mobile radio network and the terminal, the IMEI is generally passed to the mobile radio network. If new software is required for certain terminal types when a new service or a new function is introduced, then the network operator can identify the terminals on the basis of this IMEI. Following identification, the network operator can initiate the renewing of the terminal software in accordance with the invention. This process may be automated.

An exemplary embodiment of the invention will be explained with reference to the drawing FIG. 1.

The mobile radio terminal 1 illustrated in the example comprises, in a known manner, a radio part 2, essentially comprising a transmitter 3, a receiver 4 and an antenna 5, a data processing part 6, essentially comprising a processor 7 and a memory 8, and a control part 9, essentially comprising a display 10 and a keyboard 11. The data processing part 6 and the radio part 2 as well as the control part 9 are controlled via software, which includes a number of program files and is stored in the memory 8.

The mobile radio terminal communicates with base stations BTS 13 in the mobile radio network 12. According to the invention, new program files for the mobile radio terminal 1 may be kept available in a service facility 14, which is linked to the mobile radio network 12.

Whenever a connection is set up between the mobile radio network 12, BTS 13 and the terminal 1, the IMEI is passed to the mobile radio network 12. The terminal 1 is identified in the service facility 14 on the basis of its IMEI. If there is new software for the terminal 1, then the renewing of the terminal software is initiated in accordance with the invention. The new program files are transferred to the terminal 1 from the service facility 14 via the. mobile radio network 12, BTS 13, and are stored in the memory 8. The new program files are then installed.

LIST OF REFERENCE SYMBOLS

1 Mobile radio terminal
2 Radio part
3 Transmitter
4 Receiver
5 Antenna
6 Data processing part
7 Processor
8 Memory
9 Control part
10 Display
11 Keyboard
12 Mobile radio network
13 Base station
14 Service facility

The invention claimed is:

1. A method for renewing program files of a programmable, mobile telecommunications terminal, in which the program files are transmitted by a mobile carrier's telecommunications network via an air interface to the telecommunications terminal, comprising:
   automatically transmitting an IMEI of the terminal from the terminal to the mobile carrier's telecommunications network each time a connection is established between the terminal and the mobile carrier's telecommunications network;
   determining the terminal type at the telecommunications network on the basis of the IMEI for the terminal;
   automatically identifying a need to replace program files in the terminal at the time of the connection and initiating a process for renewing of the program files based solely on transmission of the IMEI from the terminal to the telecommunications network and for determining whether new program files are available for the terminal type determined, each time a connection is established between the terminal and the telecommunications network and the IMEI of the terminal is transmitted from the terminal to the telecommunication network;
   automatically initiating a process for transferring the existing new program files via the air interface to the terminal only when it is determined that new program files are available; and
   automatically installing the transferred new program files in the terminal, or automatically replacing existing program files with the transferred new program files, wherein the terminal receives and stores program files or parts of program files from the telecommunications network during operation, and installs these program files or replaces existing program files automatically once the program files or parts of program files have been received completely.

2. The method as claimed in claim 1, characterized in that the transfer and installation of the program files take place only after acceptance by the user of the terminal (1).

3. The method of claim 1, wherein determining the terminal type at the telecommunications network on the basis of the IMEI for the terminal is performed each time the IMEI of the terminal is transmitted from the terminal to the telecommunications network.

* * * * *